United States Patent [19]

Naghi

[11] Patent Number: 4,951,425
[45] Date of Patent: Aug. 28, 1990

[54] COMPUTER AND VIDEO GAME CLEANING CARTRIDGE

[76] Inventor: Herschel Naghi, 7962 Oceanus Dr., Los Angeles, Calif. 90046

[21] Appl. No.: 430,627

[22] Filed: Nov. 2, 1989

[51] Int. Cl.⁵ ............................................. B24P 15/02
[52] U.S. Cl. ................................ 51/205 WG; 51/392; 15/210 R
[58] Field of Search .............. 51/281 R, 204, 205 R, 51/205 WG, 214, 327, 181 NT; 15/101, 104.94, 210

[56] References Cited

U.S. PATENT DOCUMENTS

| | | | |
|---|---|---|---|
| 1,636,083 | 7/1927 | Stewart | 51/205 WG |
| 4,428,092 | 1/1984 | Lipari | 15/104.94 |
| 4,518,823 | 5/1985 | Kessler | 379/93 |
| 4,542,950 | 9/1985 | Gillette et al. | 339/75 |
| 4,560,223 | 12/1985 | Cooney et al. | 339/95 |
| 4,634,210 | 1/1987 | Crawford | 339/176 |
| 4,647,140 | 3/1987 | Crawford | 339/176 |
| 4,705,338 | 11/1987 | Sitzler | 439/260 |
| 4,733,678 | 3/1988 | Bolois | 15/210 R |
| 4,744,764 | 5/1988 | Rubenstein | 439/62 |
| 4,795,354 | 1/1989 | Owen | 439/137 |

Primary Examiner—Robert A. Rose
Attorney, Agent, or Firm—Christie, Parker & Hale

[57] ABSTRACT

A cleaning cartridge is provided for cleaning cartridge receptacle connector blocks located in computers and video games. The cleaning cartridge comprises a planar board having a configuration similar to that of a printed circuit board. The board contains a burnishing layer on at least one planar surface and is secured in a support housing configured to the shape of a program or game cartridge shell. When the housing is inserted into a cartridge slot, the burnishing layer on the board engages and cleans the electrical contacts of the connector block located within the slot. Cleaning is carried out by a simple insertion and removal operation permitting it to be accomplished by the average personal computer and video game user.

7 Claims, 2 Drawing Sheets

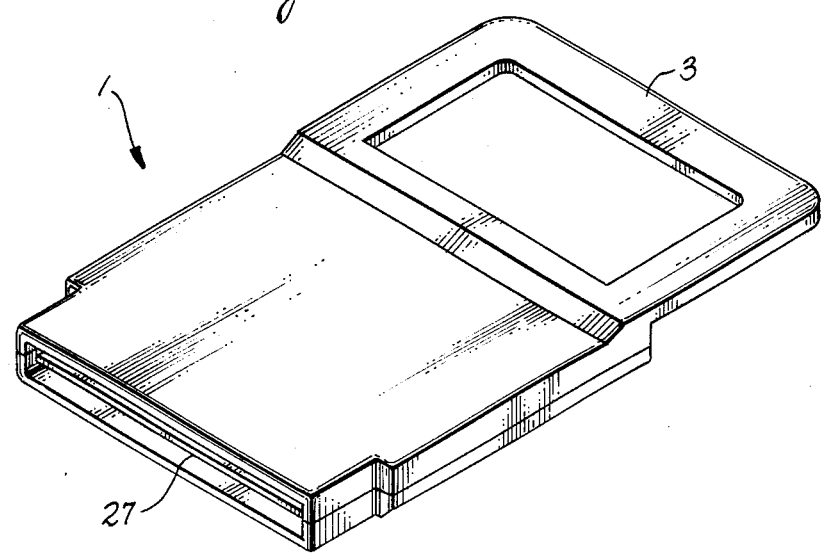
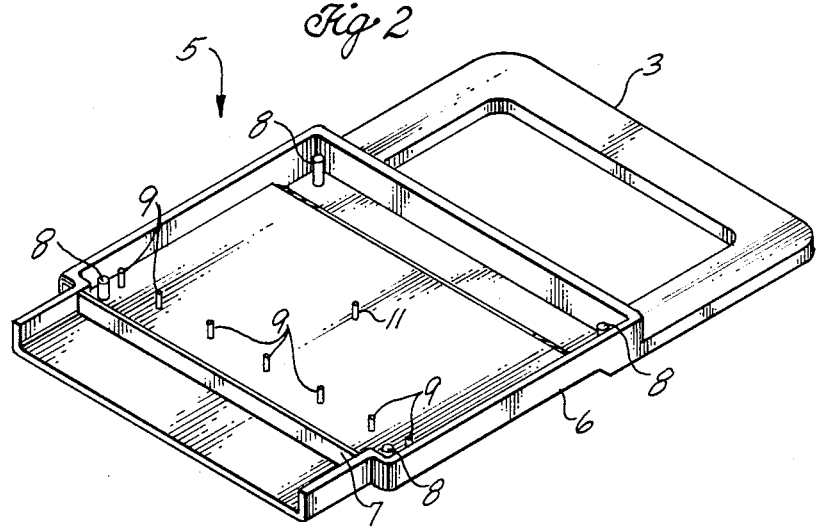

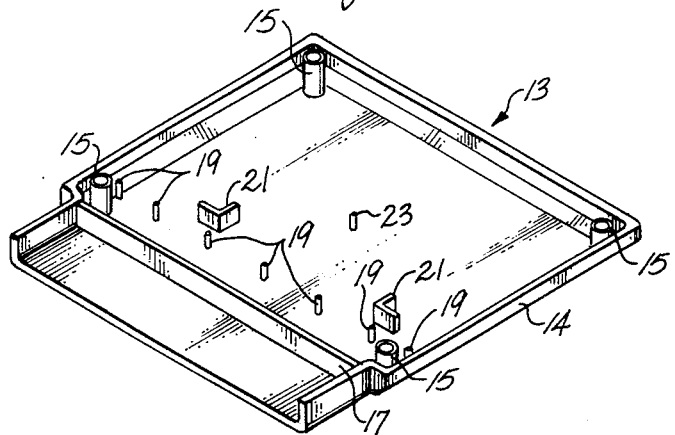
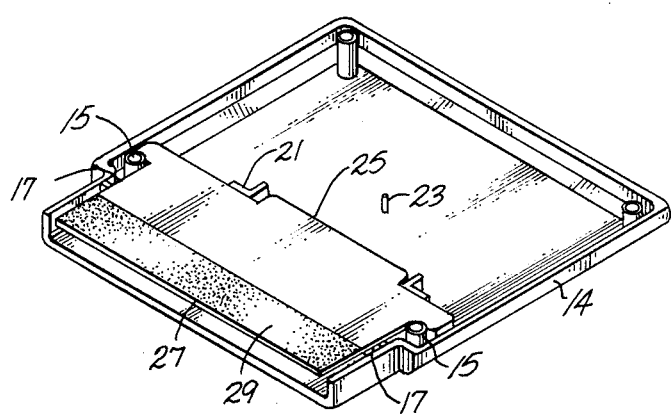

COMPUTER AND VIDEO GAME CLEANING CARTRIDGE

FIELD OF THE INVENTION

The present invention relates generally to the field of cleaning printed circuit board connector blocks and in particular to cleaning connectors used to receive program cartridges in video games and personal computers.

BACKGROUND OF THE INVENTION

Many personal computers and most home use video game systems are provided with one or more program cartridge receptacles. The receptacles are used to receive commercially available game and other types of program cartridges. A typical cartridge consists of a printed circuit board enclosed in a shell. The printed circuit board comprises electronic components connected to one another and to an array of pad-type contacts affixed along one edge of the board. The components on the board are electrically connected to the electronic circuits of a computer or video game system by insertion of the cartridge into a system receptacle provided for this purpose. This results in the insertion of the printed circuit board edge contacts into a printed circuit board connector block located within the system receptacle.

The frequent insertion and removal of cartridges causes dust, oxidization from the printed circuit board contacts and other foreign matter to be deposited onto the contacts of the connector block within the computer or video game. This debris may adversely affect electrical circuit performance of the system making the cleaning of these contacts a desirable maintenance procedure.

Such cleanings, however, are not easily accomplished by the users of such systems. The location of the connector block within the cartridge receptacle makes it difficult to reach for cleaning. Additionally, the typical user is unfamiliar with the currently practiced methods of cleaning connector block contacts with alcohol and swabs or hand held burnishing tools. A need exists, therefore, for a simple and inexpensive device which provides an improved means for cleaning program cartridge connector blocks. Such a device should be easily employable by system users and permit efficient connector block contact cleaning.

SUMMARY OF THE INVENTION

The present invention provides a planar board covered by a lapping film which is used to burnish cartridge slot connector block contacts.

When used as a cleaning cartridge a presently preferred embodiment of the invention comprises a board, having a shape similar to that of a printed circuit board, covered along one edge by a lapping film. A support housing, which may be fashioned in the shape of a cartridge shell, is configured to receive the planar board and to fit within the cartridge receptacle of a computer or video game. When the housing is inserted into the receptacle, the lapping film engages and cleans the electrical contacts of the printed circuit board connector block located within the receptacle. The housing is then removed from the receptacle completing the cleaning process.

Because the use of the cleaning cartridge follows the same procedure as is used to insert and remove a program or game cartridge, the average user requires no additional skills or training to use this embodiment of the invention.

The foregoing and other advantageous and distinguishing features of the invention are described in detail below and are recited in the appended claims.

Brief Description of the Drawings

FIG. 1 is a perspective view of a presently preferred embodiment of the invention when used as a cleaning cartridge;

FIG. 2 is perspective view of a first half of the housing shown in FIG. 1;

FIG. 3 is perspective view of a second half of the housing shown in FIG. 1; and

FIG. 4 is perspective view of the second half of the housing shown in FIG. 3 and a board located in the housing.

DETAILED DESCRIPTION

When used as a cleaning cartridge, the presently preferred embodiment of the invention comprises a substantially rectangular housing 1 having a insertion handle 3 affixed to one end. The housing and handle may be made of a thermosetting plastic or other easily formed rigid material. The housing is dimensioned to fit the cartridge slot of the video game or computer with which it will be used.

The housing is comprised of two halves. As best seen in FIG. 2, the first half 5 is formed in a shallow rectangular tray configuration 6, open at one end, having a reduced width near the open end. The handle 3 is located at the closed end of the tray 6. A first supporting lip 7 extends across the reduced width portion of the tray 6 near where the reduced width portion and the full width portion of the tray are joined. A plurality of engaging pins 8 are located near the perimeter of the tray 6. A multiciplity of locating pins 9 are located along a line across the wide portion of the tray 6 parallel to and near to the supporting lip 7. At least one supporting pin 11 is located near the center of the tray 6 extending the full height of the tray. The engaging pins 8, locating pins 9 and supporting lip 7 each extend to a height just below the upper surface of the perimeter of the tray 6.

As shown in FIG. 3, the second half 13 of the housing 1 is formed in a second tray configuration 14 having the same perimeter dimensions as the first tray 6. A plurality of cylinders 15 are located near the perimeter the second tray 14 and are configured to cooperate with the engaging pins 8 in the first tray 6 to hold the housing 1 in a closed position when the two halves 5 and 13 are fitted together in a face abutting relationship. A second supporting lip 17 extends across the second tray 14 and is located and dimensioned to cooperate with the first supporting lip 7, as described below. A multiciplity of locating pins 19 are located along a line across the wide portion of the second tray 14 located and configured to cooperate with the locating pins 9 attached to the first tray 6, as described below. At least two stops 21 are located in the second tray 14 aligned parallel to and near to the locating pins 19. A second supporting pin is located near the center of the second tray 14 which engages the first supporting pin 11 when the halves 5 and 13 are fitted together to prevent the mid-portions of the trays 6 and 14 from collapsing towards one another in response to an unexpected outside force.

Referring now to FIG. 4, a planar board 25, configured to fit between the two halves 5 and 13, is mounted in the housing 1. The board is supported and held in position by the locating pins 9 and 19, the first and second supporting lips 7 and 17, the stops 21 and by at least two of the locating pins 9 and cooperating cylinders 15. The board 25 is located within the housing 1 such that one edge 27 extends into the reduced width portions of the trays 6 and 14 duplicating the location and configuration of the edge of a printed circuit board located within a video game or computer cartridge.

Adjacent to this edge 27, a portion of at least one planar surface of the board 25, is covered by a layer of aluminum oxide having an average particle size of approximately 3 microns. A suitable layer may be comprised of a lapping film 29. An exemplary film having a 3 mil thickness is manufactured by 3M Company and marketed under the name of IMPERIAL LAPPING FILM. The lapping film 29 is bonded to the board 25 by means of adhesive applied to the back of the film 29.

In use the housing 1 is inserted into a computer or video game cartridge slot bringing the lapping film 29 into sliding contact with the electrical contacts of the cartridge connector block located within the slot. The housing is then removed from the slot by use of the handle 3. The corresponding removal of the lapping film 29 from the connector block completes the cleaning operation. The aluminum oxide on the lapping film 29 burnishes the electrical contacts of the connector block, removing any debris deposited thereon without damage to the contacts.

In view of the foregoing description of the preferred embodiment of the invention, those skilled in the relevant arts will have no difficulties making changes and modifications in the different described elements of the invention in order to meet their specific requirements or conditions. For example, the housing 1 and planar board 25 may be of any shape necessary to conform to the computer or video game cartridge slot and the edge connector block therein to be cleaned. Lapping films of other than a 3 mil thickness may be used. The invention in other embodiments may be used to clean program and memory cartridge connector blocks in portable and lap-top computers. All such changes and modifications may be made with out departing from the scope and spirit of the invention as set forth in the following claims.

What is claimed is:

1. A cleaning cartridge for cleaning the electrical contacts of a printed circuit board connector block located within a computer or video game cartridge receptacle, the cleaning cartridge comprising:

a planar board comprising a layer of burnishing material on at least one planar surface adjacent one edge of the board; and a housing configurated to receive the planar board and to fit within the cartridge receptacle, such that when inserted in the receptacle, the burnishing layer on the board engages and cleans the electrical contacts of the printed circuit board connector block.

2. The cleaning cartridge of claim 1 wherein the layer of burnishing material comprises aluminum oxide.

3. The cleaning cartridge of claim 2 wherein the layer of aluminum oxide is comprised of particles averaging approximately 3 microns in size.

4. The cleaning cartridge of claim 1 wherein the layer of burnishing material is comprised of lapping film.

5. The cleaning cartridge of claim 1 wherein the housing additionally comprises a handle facilitating the removal of the housing from the cartridge receptacle.

6. The cleaning cartridge of claim 1 wherein the housing additionally comprises two halves, the halves having a plurality of engaging pins and cylinders such that when the halves are brought together in a face abutting relationship the pins engage the cylinders holding the housing in a closed position.

7. The cleaning cartridge of claim 7 wherein the housing additionally has a plurality of supporting pins, supporting lips and stops in the housing whereby the board may be secured within the housing when the housing is in a closed position.

* * * * *

UNITED STATES PATENT AND TRADEMARK OFFICE
CERTIFICATE OF CORRECTION

PATENT NO. : 4,951,425
DATED : August 28, 1990
INVENTOR(S) : Herschel Naghi

It is certified that error appears in the above-identified patent and that said Letters Patent is hereby corrected as shown below:

```
At column 1, line 43, "hand held" should be --hand-held--;
at column 2, lines 12, 14, and 16, after "is" and before
"perspective" -- a -- should be inserted (all occurrences);
at column 2, line 24, before "insertion" "a" should be -- an--;
at column 2, line 39, "multiciplity" should be --multiplicity--;
at column 2, line 50, after "perimeter" insert -- of --;
at column 2, line 57, "multiciplity" should be --multiplicity--;
at column 2, line 66, "mid-portions" should be -- midportions--;
at column 3, line 35, "different" should be -- differently --;
at column 4, line 3, "with out" should be --without --;
at column 4, line 14, "configurated" should be --configured --;
at column 4, line 37, after "claim", "7" should be -- 6 --.
```

Signed and Sealed this

Third Day of November, 1992

*Attest:*

DOUGLAS B. COMER

*Attesting Officer*   *Acting Commissioner of Patents and Trademarks*